Sept. 19, 1967  H. W. GRIFFIN  3,342,525
CONVERTIBLE TOP LATCH MECHANISM
Filed June 23, 1965  3 Sheets-Sheet 1

INVENTOR.
Henry W. Griffin
BY
Edward E. James
ATTORNEY

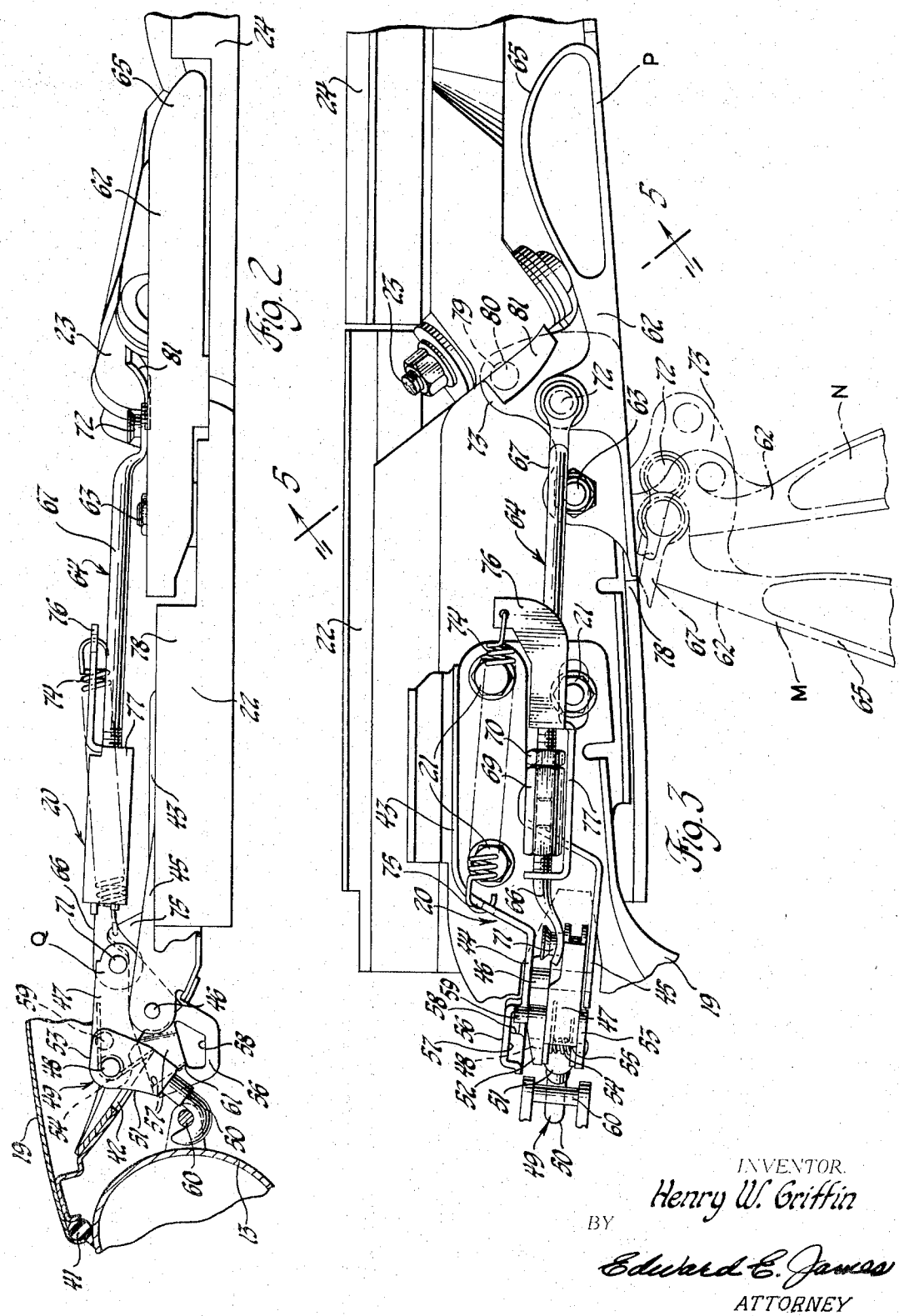

Sept. 19, 1967 H. W. GRIFFIN 3,342,525
CONVERTIBLE TOP LATCH MECHANISM
Filed June 23, 1965 3 Sheets-Sheet 3

INVENTOR.
Henry W. Griffin
BY
Edward E. James
ATTORNEY

United States Patent Office 3,342,525
Patented Sept. 19, 1967

3,342,525
CONVERTIBLE TOP LATCH MECHANISM
Henry W. Griffin, Birmingham, Mich., assignor to General Motors Corporation, Detroit, Mich., a corporation of Delaware
Filed June 23, 1965, Ser. No. 466,217
3 Claims. (Cl. 296—121)

This invention relates generally to convertible tops and more particularly to latch mechanisms adapted to latch a top header to a windshield support in top raised position.

In convertible tops of the inward folding type disclosed in copending application Ser. No. 466,020, Podwys, filed June 22, 1965, a rearward extension of the top header is pivoted to the side rails. In the top raised position, misalignment or dimensional variance of the top will permit relative pivotal movement between the header and side rails.

Thus it is the primary object of this invention to provide an improved top latch mechanism mounted on the top header and actuatable to latch the header to the windshield support in top raised position and to lock the header and side rail together against relative pivotal movement. It is another object to provide the latch operating means and the side rail with cooperative locking means to lock the top against this pivotal movement upon movement of the operating means to latched position.

These and other objects of the invention will be apparent from the following description of the preferred illustrative embodiment, having reference to the accompanying drawings, in which:

FIGURE 2 is an enlarged fragmentary view corresponding to a portion of FIGURE 1 and shows the illustrative top locking mechanism in side elevation;

FIGURE 3 is an enlarged fragmentary plan elevational view further showing the mounting and operational interrelationship of the illustrative top locking mechanism relative to the pivotally interconnected ends of the front rail and forward side rail members;

Figure 1:
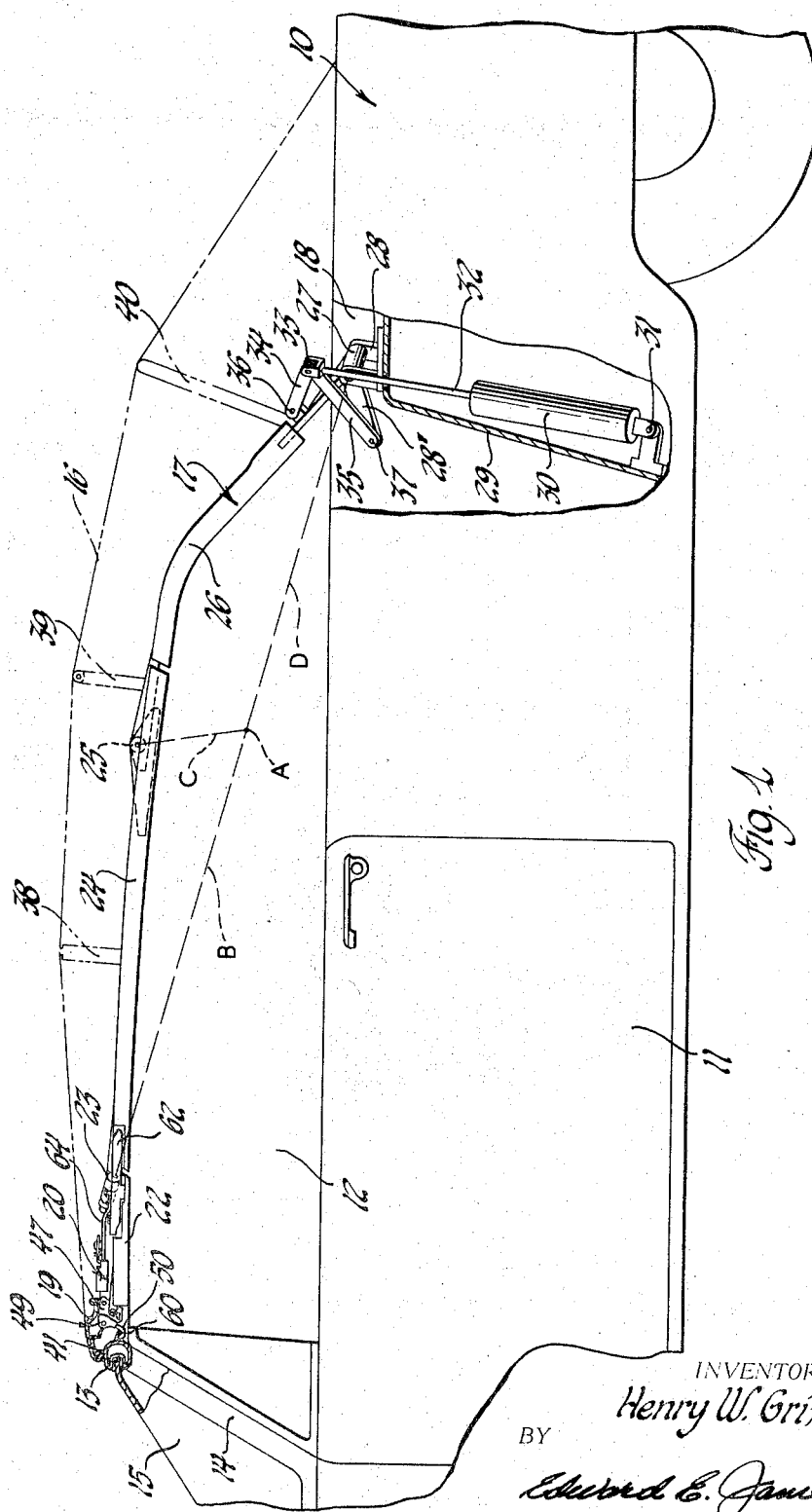
FIGURE 1 is a partial side elevational view of a convertible vehicle body with portions broken away and with the foldable top removed and shown in broken phantom lines and shows the top operating and supporting frame linkage including a top locking mechanism embodying the invention in a raised and fully extended locked position enclosing the passenger compartment of the vehicle.

Referring more particularly to FIGURE 1, a portion of a convertible vehicle body is indicated generally by the reference numeral 10 and has two front doors 11 suitably hinged to provide access to a body defined passenger compartment 12. The invention would be equally applicable, however, to a four-door convertible body. A windshield header 13 and two vertically inclined pillars 14, only the right-hand pillar being shown, cooperate with the vehicle body to mount a windshield 15 forwardly of the passenger compartment in a conventional manner. A fabric top indicated in phantom lines at 16 is foldable by an articulated top supporting frame linkage 17 between a raised top closing position and a folded position retracted substantially within a top housing well 18 located behind a rear seat in the passenger compartment. As indicated above, the top supporting frame may be of the type having inwardly folding side rails and the frame illustrated in FIGURE 1 is substantially similar to that shown and described in co-pending United States patent application Ser. No. 466,020, Podwys, filed June 22, 1965.

The top supporting frame 17 includes a front rail member 19 which is movable to a raised position in weather sealing engagement with the windshield mounting header 13. The raised front rail is normally locked in such header engagement by operation of latch mechanisms 20 constructed in accordance with the invention and mounted on the laterally spaced opposite ends of the front rail member. In the accompanying drawings, only the right-hand side of the top supporting frame and the right-hand latch mechanism are shown in structural and operational detail and the following description is specifically related thereto. It will be apparent, however, that the left-hand portion of the top supporting frame and the left-hand latch mechanism would be of similar construction but of opposite hand. The following description is thus equally applicable to the reversed configurations of the left side of the top supporting frame and to the left-hand latch mechanism mounted thereon.

As shown in FIGURES 1–3, the laterally spaced opposite ends of the front rail 19 are secured at 21 to relatively short, rearwardly extending stub rail members 22. These front rail end members are each pivotally hinged at 23 to the forward end of an intermediate side rail member 24. The rear end of each side rail 24 is pivotally hinged at 25 in side-by-side relation to the forward end of a rear side rail member 26. The opposite end of each rear side rail member is angled downwardly from the hinge 25 and is pivotally supported at 27 by a clevis forming bracket 28. The two rear side rail hinging brackets 28 are obliquely and spacedly mounted on a horizontally disposed portion of an angled panel 29 which extends transversely of a vehicle body between the two rear wheel housings, not shown. The angled panel 29 defines the bottom wall of the top well 18 and forms an inclined rear seat back supporting member.

A conventional hydraulic power actuator 30 is pivotally mounted at 31 adjacent each lower corner of the body panel 29. A piston rod 32 extends upwardly from the hydraulic cylinder of each actuator and is operably connected to swing the adjacent rear side rail member between its retracted and raised top closing positions. In the illustrative embodiment, the upper end of each piston rod 32 extends through a perforation provided in the rear seat panel adjacent each top supporting bracket 28 and is pivotally connected at 33 to a pair of links 34 and 35. The link 34 is pivotally connected at 36 to the adjacent rear side rail member 26 and the link 35 is pivotally connected at 37 to a lateral extension 28' of the top supporting bracket 28. The links 34 and 35 thus serve to translate the piston rod movement imparted to each pivot 33 into appropriate swinging movement of the adjacent rear rail member.

The pivotal axes of the several rail interconnecting hinges 23, 25 and 27 are shown in broken line in FIGURE 1 and designated B, C and D, respectively. To provide the desired inwardly folding side rail movement, these pivotal hinge axes are arranged to converge and intersect at a common point A located inwardly and below the side rails of the raised top supporting frame. To lower the top to its folded or retracted position, the hydraulic actuator 30 is selectively energized to withdraw the piston rod 32 into the actuator cylinder. Such downward movement of the piston rod 32 causes the rear rail member 26 to be swung rearwardly of the body about the obliquely inclined axis D. This in turn causes the front and intermediate side rail members 19 and 24 to be folded with respect to the rear side rail member 26 about the inclined pivotal axes B and C, respectively. During such rail folding movement, the front rail remains substantially parallel to the windshield mounting header and to the body as the top is folded downwardly to its lowered position within the body defined top well. When the actuators 30 are selectively energized to cause reverse upward movement of the piston rods 32, the resultant linkage controlled movement causes the rear side rail members to be swung to their raised positions thereby causing the intermediate side rail and front rail members to be swung forwardly to their top closing positions. Several top supporting bows 38, 39 and 40 are pivotally mounted on and extend laterally between corresponding side rail members. These bows are spacedly secured to the undersurface of the fabric top and are swung upwardly to raised top supporting positions during movement of the frame 17 to its top closing position.

The intermediate portion of the front rail member 19 is bowed transversely of the vehicle and mates substantially with the windshield supporting header 13 when in its top closed position shown in FIGURES 1 and 2. A resilient weatherseal strip 41 carried by this front rail portion is sealingly and compressively engageable with the windshield header upon locking operation of the laterally spaced top latching mechanisms 20. The angled front rail end portions are perforated at 42 forwardly of the stub rail members and adjacent their cornered juncture with the intermediate portion of the front rail member. The short front rail end members 22 secured to these angled end portions are of stepped channeled section and open upwardly toward the fabric top. In the illustrative embodiment, each latch mechanism 20 is mounted substantially within the stepped channels of the front rail end members and each has a latch member or bolt 50 which extends through the adjacent rail opening 42 and is movable between a retracted striker disengaging position and a top locking position in latching engagement with a striker 60 mounted on the adjacent upper corner of the windshield header and pillar.

Figure 4:
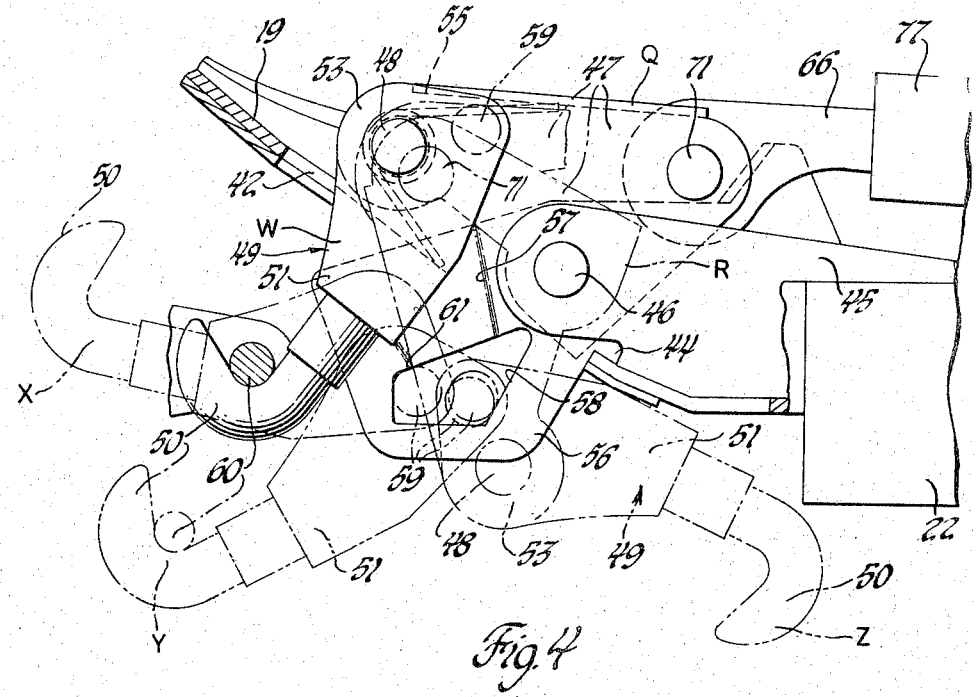
FIGURE 4 is a further enlarged view corresponding to a portion of FIGURE 2 and illustrates different operative positions of the several top latching elements in full and broken lines.

Each latch mechanism 20 includes a mounting bracket 43. As shown in FIGURE 3, these brackets are suitably secured for limited adjustment longitudinally of the channeled forward ends of the front rail end members 22. As further shown in FIGURES 2–4, the forward end of each bracket 43 has two laterally spaced upstanding arms 44 and 45. A pivot pin 46 is supported by and extends transversely between these bracket arms above the adjacent front rail opening 42. A folded triangularly-shaped bellcrank lever 47 is pivotally mounted at one corner on the pin 46 for swinging movement between a latch engaging position Q shown in full lines in FIGURES 1–4 and a latch disengaging position R shown in broken lines in FIGURE 4. A second pivot pin 48 mounted in a second corner of the lever 47 forms a lever arm with respect to the pivot pin 46 and pivotally mounts a two-piece latch member 49.

The two-piece latch member 49 includes a hook-shaped bolt 50. The shank portion of this bolt member is threadably mounted and longitudinally adjustable in a support member 51. The member 51 has spaced clevis arms 52 and 53 which are pivotally mounted on the projecting ends of the pin 48. A helical spring 54 embraces the pin 48 within the hollow recess of lever 47 and is torsionally interposed as shown between the lever and the bolt supporting member 51. The spring 54 thus tends to bias the latch member 49 in clockwise, striker engaging direction as viewed in FIGURES 2 and 4 towards an extended position wherein the bolt supporting member 51 engages a transverse fold-over flange 55 formed on the bellcrank lever.

The upstanding arm 44 on the latch mounting bracket 43 has a flange 56 which extends forwardly and downwardly of the bellcrank mounting pin 46. This flange forms a cam which is normally operable to control swinging movement of the latch member 49 between striker engaging and disengaging positions. A channel or groove 57 formed in this cam flange is spaced laterally from and faces the bellcrank lever 47 and the latch supporting member 51. The channel 57 is open at its upper end and is tapered downwardly of the flange between vertically inclined, converging side walls and terminates downwardly in an enlarged triangularly-shaped cam slot 58. The obliquely inclined bottom surfaces of this cam slot are engageable with a pin 59 carried by the latch member 49. In the illustrative latch mechanism, this cam engaging pin projects laterally from the adjacent clevis arm 52 of the bolt supporting member 51 in spaced parallel relation to the latch pivoting pin 48. Such pin and cam surface engagement normally occurs and controls swinging of the latch member 49 during movement between a retracted striker disengaging position and an initial striker engaging position.

During downward swinging movement of the bellcrank lever 47 from its latch engaging position Q toward its extreme latch disengaging position R, the cam pin 59 normally passes downwardly through the channel 57 until it initially engages the forward bottom surface of the cam slot 58. Further downward swinging movement of the bellcrank lever 47 causes the cam engaged pin 59 to rotate the latch member 49 in a counterclockwise direction against the biasing action of the spring 54 to its extreme latch disengaging position shown in broken lines at Z in FIGURE 4. In this retracted position, the latch bolt 50 is removed from potential engagement with the keeper or striker 60 and the adjacent corner of the windshield header and pillar during opening and closing movement of the top supporting front rail member.

The latch member 49 is normally stored with the folded top in its fully retracted position. During upward clockwise swinging movement of the bellcrank lever 47 after subsequent top raising and closing movement of the front rail member proximate the front windshield member 13, relative movement between the cam slot 58 and the pin 59 permits the spring 54 to rotate the latch member 49 in a clockwise direction from its extreme retracted position Z toward an extended striker engaging position shown in broken lines at Y in FIGURE 4. In approaching this extended lever position, the hook-shaped bolt member 50 normally engages the adjacent keeper or striker 60 as the pin 59 reaches the forward end of the cam slot 58. After the bolt 50 engages the striker, further upward swinging movement of the bellcrank lever 47 rotates the latch member 49 slightly in a counterclockwise direction. Such rotation of the latch member swings the pin 59 rearwardly and upwardly and permits the pin to pass upwardly through the channel 57 as the bellcrank lever is further actuated to its extreme latch engaging position Q. Such actuation of the bellcrank lever carries the latch member to an extreme top locking position shown in full lines at W in FIGURE 4. The clamping forces thus exerted through the two laterally spaced latch members are sufficient to compressively seal the weatherstrip between the windshield header 13 and the front rail 19 under all normal vehicle operative conditions.

In some cases, latching engagement with the striker 60 may not occur as the latch member approaches and reaches its initial striker engaging position Y. Such latching failure may be due to incomplete closing or lateral misalignment of the front rail with respect to the windshield header. If this occurs, further upward swinging movement of the bellcrank lever swings the latch lever cam pin 59 upwardly into blocking engagement with an overhanging detent shoulder 61 formed on the cam flange 56 by the forward end of the cam slot 58 and the forward side wall of the channeled groove 57. Such pin blocking engagement tends to prevent further latch engaging movement of the bellcrank lever and the latch operating linkage until the latch member has been returned to a retracted position and the front rail has been brought into proper engagement and alignment with the windshield header.

As best shown in FIGURES 2 and 3, a latch operating lever 62 is pivotally mounted at 63 rearwardly of the front rail end member 22 and is operably connected by an adjustable link 64 for swinging actuation of the bellcrank lever 47 between its extreme latch engaging and disengaging positions. The operating lever 62 is thus journaled for horizontal swinging movement between an extreme latch disengaging position M shown in broken lines in FIGURE 3 and an extreme latch engaging position P. These extreme positions of the latch operating lever correspond to the latch disengaging and engaging positions R and Q, respectively, of the bellcrank lever. When actuated to its latch disengaging position M, a handle portion 65 on the operating lever extends transversely of the side rail and projects inwardly of the passenger compartment. In its latch engaging position P, the latch operating lever 64 is retracted substantially within the confines of the front rail end member 22. During movement of the operating lever between these extreme positions, the handle portion 65 passes through an intermediate position N corresponding to the striker engaging or detent blocking position of the latch member.

The opposite end portions 66 and 67 of the link 64 are threadably interconnected and adjustable by a turnbuckle nut 69. This turnbuckle nut is normally maintained in an adjusted position by a locking nut 70. The distal ends of the link portions 66 and 67 are angled or normally disposed with respect to each other so as to translate the horizontal swinging movement of the operating lever 62 between its latch engaging and disengaging positions into corresponding vertical swinging movement of the bellcrank lever. The angled opposite ends of the link portions 66 and 67 are loosely pivoted on headed studs or pins 71 and 72 which are secured to and project, respectively, from the upper rear corner of the bellcrank lever 47 as viewed in FIGURE 2 and from the operating lever 62 in spaced parallel relation to its pivotal mounting at 63. The axial and radial clearances provided between the angled link ends and the pivot studs 71 and 72 are sufficient to permit limited universal movement therebetween.

The pivot stud 72 is so located in its mounting on the operating lever that the line of action of the connecting link 64 passes slightly overcenter of the pivotal axis of the lever mounting stud 72 upon manual actuation of the operating lever to its latch engaging position shown in full lines in FIGURES 1–3. In this overcenter position of each latch operating lever, the inter-engaged latch bolts and strikers maintain the top sealing forces required between the windshield header 13 and the front rail mounted weatherstrip 41. The top locking force thus applied to each latch lever 49 is transmitted to the bellcrank lever 47 and acts through the link 64 and the slightly overcenter pivot stud 74 to bias and maintain the operating lever 62 in its retracted latch engaging position wherein a limit arm 73 extending laterally of the operating lever engages the stop flange 73' depending from the hinged forward end of the rail member 24.

As shown in the illustrative latch mechanism, a spring 74 is tensively interposed between an upstanding flange 75 formed on the rail mounted bracket 43 and an adjustable spring seating flange 76 extending rearwardly of a turnbuckle bracket 77. This spring seating bracket is mounted on the link end portions 66 and 67 as shown for threadable spring adjusting rotation about the turnbuckle nuts 69 and 70. The spring seating flanges 75 and 76 are so located that the line of action of the spring 74 is applied to the link 64 and passes overcenter of the pivot 63 during movement of the operating lever effecting initial bolt and striker engagement. After such overcenter spring movement, the spring 74 acts through a progressively increasing effective moment arm to assist the operator in actuating the operating lever and the connected elements of the latch mechanism to their extreme latch engaging, top locking positions. The turnbuckle adjustable spring 74 further cooperates with the overcenter biasing action of the link 64 to provide and maintain the top sealing and locking forces necessarily required between the windshield header and the front rail of the top structure.

During actuation of the operating lever in a clockwise direction as viewed in FIGURE 3, the spring 74 is carried overcenter of the pivotal mounting stud of the operating lever and thereafter biases the operating lever toward its extreme latch disengaging position. Such spring-biased latch disengaging movement of the operating lever is transmitted through the link 64 and effects downwardly swinging movement of the bellcrank lever 47 to its extreme lower position wherein the latch member 49 is fully retracted by cooperative engagement between the cam pin 59 and the cam slot 58 on the bracket flange 56. Depending on the turnbuckle adjusted length of the link 64, extreme latch disengaging position of the operating lever is alternately determined by the fully retracted position of the latch member or by limiting engagement with a flanged edge 78 on the latch mounting rail member 22.

Figure 5:
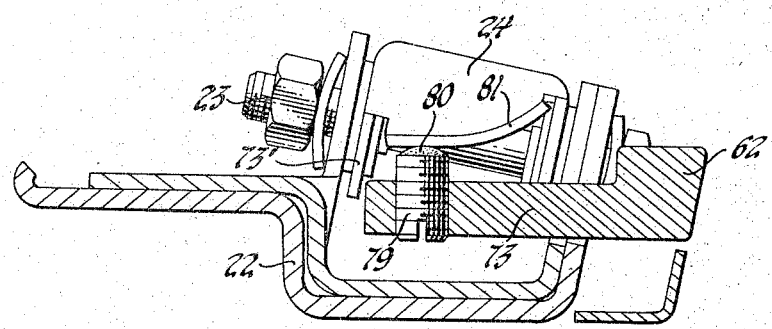
FIGURE 5 is an enlarged fragmentary sectional view taken substantially in the plane of the line indicated at 5—5 in FIGURE 3.

As shown in FIGURE 5, a self-locking set screw 79 is threadably mounted as shown in the limit arm 73 of the latch operating lever. A nylon button 80 is journaled in the upper end of this screw. This button has a semi-spherical bearing head which rotatably and slidably engages a downwardly and outwardly inclined arcuate flange 81 formed on the adjacent hinged forward end of the intermediate side rail member 24. As the latch operating lever aproaches its extreme stop limited and latch engaging position, engagement between the hinge flange 81 and the bearing end of the set screw 79 carries the pivotally interconnected front and side rail members 22 and 24 to fully extended interlocked positions. Such rail locking and lost motion take-up about the pivotal axis of the hinge 23 also serves to take up any lost motion occuring at the converging hinges 25 and 27 provided respectively between the side rail members 24 and 26 and between the rear side rail member 26 and the top supporting bracket 28.

It will be apparent that various structural and operational changes might be made in and from the illustrative embodiment without departing from the spirit and scope of the invention as defined in the following claims.

I claim:

1. In combination, a vehicle body having a convertible top movable between raised and lowered positions relative to a top support, the top including a header member, a side rail member, means pivotally interconnecting the header member and the side rail member, latch means mounted on one of the members and movable between a latched position to latch the header member to the top support and an unlatched position to unlatch the header member from the top support, and cooperating means on the latch means and on the other member for locking the header member and the side rail member together against relative pivotal movement when the latch means are in latched position.

2. The combination of claim 1, wherein the latch means include an operating member mounted on the header member and movable between latched and unlatched positions to effect latching and unlatching of the header member and top support, and the cooperating means include first locking means mounted on the operating member and second cooperative locking means mounted on the side rail member, movement of the operating member to latched position effecting cooperative locking engagement of the first and second locking means to lock the header member and the side rail member against relative pivotal movement.

3. The combination of claim 2, wherein the second locking means include a flange extending from the side rail member adjacent the pivotal connection and the first locking means include an abutment mounted on the operating member and movable into engagement with the flange upon movement of the operating member to latched position to lock the header member and the side rail member together against relative pivotal movement.

References Cited

UNITED STATES PATENTS

| | | | |
|---|---|---|---|
| 2,860,913 | 11/1958 | Kuiper et al. | 296—107 |
| 3,129,025 | 4/1964 | Krueger. | |
| 3,146,022 | 8/1964 | Zeller | 296—116 |
| 3,216,763 | 11/1965 | Heincelman | 296—121 |
| 3,266,838 | 8/1966 | Heincelman | 296—121 |

BENJAMIN HERSH, *Primary Examiner.*

C. C. PARSONS, *Assistant Examiner.*